United States Patent Office 2,911,310
Patented Nov. 3, 1959

2,911,310

INVESTMENT MATERIALS FOR CASTING MOULDS

Noel Shaw, Ivy Lea, Haydon Bridge, England, assignor, by mesne assignments, to Shaw Process Development Corp., Port Washington, N.Y.

No Drawing. Application November 24, 1954
Serial No. 471,083

9 Claims. (Cl. 106—38.2)

This invention relates broadly to the method of preparing investment materials for moulds, cores and allied articles in connection with casting of metals, alloys, ceramics, etc., and particularly pertains to the liquid and filler parts of such investment materials, similar to that disclosed in co-pending patent application Serial No. 347,829, filed April 9, 1953, now Patent No. 2,795,022, and copending patent application Serial No. 414,884, filed March 8, 1954, now Patent No. 2,811,760, both assigned to Shaw Processes Limited, 41 Carliol Street, Newcastle-on-Tyne 1, England.

In these applications the filler is given as any suitable refractory material, such as comminuted sillimanite, which is prepared in different sieve sizes and wherein certain percentages of the refractory in the various sieve sizes are thoroughly intermixed before use. The liquid portion of the investment, defined as "liquid medium," now termed "binder" is added to the mixed refractory material to form a slurry.

It has now been found that it is advantageous to add to the above binder mixture 2 to 3 ccs. of concentrated hydrochloric acid instead of the aqueous solution thereof, and wherein in that concentrated hydrochloric acid the HCl ranges from 36.5 to 38%.

In the above mentioned co-pending applications there has been also given a "gelling agent" for controlling the gelling time of the slurry, that gelling agent comprising a solution of two ounces of ammonium carbonate dissolved in one pint of distilled cold water.

It has been found that by adding the above-stated small percentage of the concentrated hydrochloric acid to the binder, the gelling time of the slurry by the introduction of the gelling agent can be more exactly controlled.

It has been also found that in compounding the binder ingredients, superior results were obtained by adhering to the definite binder formulation given below, which is one of the objects of the present invention. Computing the binder composition to produce approximately one imperial gallon, there are prepared three distinct batches or portions of liquids, which, for the purpose of simplicity, are designated as solutions No. 1, No. 2 and No. 3.

Solution No. 1 comprises:
800 ccs. of commercial denatured ethyl alcohol, and wherein the composition of that alcohol is approximately as follows: For each 100 parts of absolute ethyl alcohol there are—
  1 part of tertiary butyl alcohol
  1 part of methyl iso butyl ketone
  1 part of commercial aviation gasoline and
  2 parts or less of water.
304 ccs. of distilled water, and
2 to 3 ccs. of concentrated hydrochloric acid, having an HCl content of from 36.5 to 38%.

Solution No. 2 consists of: 1,907 ccs. of ethyl silicate, and

Solution No. 3 comprises: 1,530 ccs. of ethyl silicate.

Solution No. 1 does not require any special precaution in the mixing thereof as long as it is being properly agitated while the alcohol, water and hydrochloric acid are compounded.

Now solutions No. 1 and No. 2 are rapidly mixed while being considerably agitated. In the first stage of this mixture there will be observed a ready separation of the ingredients into layers. Agitation is then continued at intervals and after a period of time the following temperature and physical changes in the mixture will be observed.

(a) The temperature will rise rapidly due to hydrolysis.
(b) Clarification of the mixture will gradually take place.
(c) "Soapy" bubbles will form during agitation.

As the temperature of the mixture of solutions No. 1 and No. 2 reaches its peak and begins to recede, the mixture becomes water clear. When the temperature returns to normal room temperature solution No. 3 (1530 ccs. ethyl silicate) is added to the first-produced mixture and the now combined liquids are further agitated. When the thus produced mixture cools to room temperature it is ready for use.

*Specification for ethyl silicate*

It is preferred that the ethyl silicate used in the binder corresponds to the following specification:

Specific gravity at 20° centigrade ___ 1.05–1.07.
Acidity (as hydrochloric acid) _____ 0.07% maximum.
Free alcohol _____ 5% maximum.
Silica content _____ 40–43%.

It is to be observed that the above defined procedure of preparing the binder should take place at approximately room temperature, or say at 70° Fahrenheit, and the ingredients of the three solutions should also be kept at room temperature prior to compounding them. Also the ready mixed binder should be preferably stored in places kept at room temperature or lower, since if the temperature at which the binder is mixed is higher, or if the binder is stored in places where the temperature is substantially above 70°, its normal shelf life ranging from four to five weeks becomes shortened considerably.

In the previously mentioned co-pending applications the filler or refractory portion of the slurry, now designated as "Grading B," was given as follows:

Grading B:
  Sieve size—                      Approximate percentage
    Ranging from −10 to +16 _____ 40.3
    Ranging from −16 to +22 _____ 7.6
    Ranging from −22 to +30 _____ 5.8
    Ranging from −30 to +44 _____  .7
    Ranging from −44 to +60 _____  .7
    Ranging from −60 to +100 _____ 4.7
    Ranging from −100 to +150 _____ 6.4
    Ranging from −150 to +200 _____ 5.4
    Ranging from −200 _____ 28.4

There was also given the proportion between binder and the refractory and gelling agent as follows:

Binder _____ ccs__ 100
Gelling agent _____ ccs__   5
Refractory _____ grams__ 132

A more economical slurry for producing mould material for castings which do not require the reproduction of very fine details is given below:

Binder _____ ccs__ 100
Gelling agent _____ ccs__   5
Refractory (Grading B) _____ grams__ 320 to 360

It has been found that for producing castings from patterns having very fine details it is preferable to employ refractory of finer sieve size gradings combined at different percentages. A typical example of such refractory grading, designated "Grading A," follows:

Grading A:

| Sieve size— | Approximate percentage |
| --- | --- |
| Ranging from +30 | 0 |
| Ranging from −30 to +44 | 0.8 |
| Ranging from −44 to +60 | 2.2 |
| Ranging from −60 to +100 | 10.9 |
| Ranging from −100 to +150 | 12.5 |
| Ranging from −150 to +200 | 10.2 |
| Ranging from −200 | 63.4 |

In preparing a slurry by the use of "Grading A" refractory, a mixture based upon the following proportions of ingredients is preferably compounded:

| | | |
| --- | --- | --- |
| Binder | ccs | 100 |
| Gelling agent | ccs | 5 |
| Refractory | grams | 192 |

When it is desired to cast material from patterns having some details but which details cannot be considered as very fine, a slurry is prepared employing a mixture of the two refractory gradings "B" and "A." Depending upon the proportion to one another of the two refractory gradings, the quantity of the binder used in such a slurry will vary. The resulting variation will however be within the proportional figures given for slurry mixtures using gradings "B" and "A."

It is to be borne in mind that the variously compounded sieve size grades, and especially those of the coarser sizes, should have what may be termed irregular, angular and interlockable structures.

It has been explained in the aforesaid applications that in the preparation of the slurry care is to be taken not to "compact" the refractory filler, as is done, for instance, in sand moulding or the preparation of moulds for the well-known "lost wax" method. In following this procedure of not compacting the investment, the refractory particles will remain, so-to-speak, in floating suspension within the binder.

It was also stated that when the mould is stripped from the investment, the mould is "fired" to "freeze" the dimensions imparted to the mould by the pattern. The "firing" of the mould also renders the body of the mould material porous and permeable as the volatiles of the binder burn, thus providing spacings between the interlocked particles of the refractory. That spacing between and the interlocking of the particles is responsible for the fact that the finished mould becomes highly resistant to thermal shocks. When the mould is subjected to excessive heat the particles can readily expand within the spacing cavities created by removal of the binder; they will just as easily shrink when the mould is subjected to extreme cold. Such expansion and shrinkage of the particles does not affect the mould's "frozen" outer surfaces. Thus a "fired" hot mould can be immersed in cold water and again heated to relatively high temperatures without causing cracking of the mould or distortion of its "frozen" dimensions. Obviously the porosity and permeability of the mould body is of utmost importance. It permits the escape of gases during the casting procedure. Thus the requirement of vents essential in heretofore employed moulding and casting methods is obviated.

Referring to the composition of the slurry, there are given certain definite percentages of the three ingredients composing the slurry.

In each of the slurry mixtures there is given a formula calling for the proportion of one hundred cubic centimeters of the binder to five cubic centimeters of the gelling agent. The adding of the gelling agent to the binder is intended to accelerate the gelling of the slurry. It has been found that the gelling of the slurry can be readily controlled or timed, which procedure is of great advantage in that it sometimes becomes necessary to prolong the gelling period of the slurry, while on the other hand sometimes it is preferable to hasten such gelling. The period of gelling can be readily controlled by varying the percentage of the gelling agent to the binder. Thus, for instance, if only one-half cubic centimeter of gelling agent is added to one hundred cubic centimeters of the binder, the gelling period is prolonged. If on the other hand, more than five cubic centimeters, say ten cubic centimeters, of the gelling agent are added to the one hundred cubic centimeters of the binder, the gelling period is readily reduced.

Variation of the gelling period becomes frequently important in producing moulds from different patterns. When, for instance, a pattern is complicated and has some slight undercut parts which are to be withdrawn from the gelled mould mass, it is desirable that the gelling period is extended over that produced by the one hundred to five cubic centimeter proportion.

From the above it will be readily conceived that variations in the percentage between binder and gelling agent are subject to changes depending upon the type of casting to be made from the formed mould.

Similarly it will be also obvious that the percentages of the differently graded refractories in the slurry mixture will have to be varied depending upon the type of the casting desired.

On the other hand the formulation of the binder must be strictly adhered to, since if such formulation is not exactly followed, either the quality and the desired effectiveness of the binder will be impaired, or its shelf life will be materially reduced.

What is claimed as new is:

1. The formulation of a binder for use in a refractory slurry which comprises adding about 1,907 parts of ethyl silicate having a silica content of approximately 40–43% to a mixture of about 800 parts of alcohol, 300 parts of water and about 2 to 3 parts of concentrated hydrochloric acid, agitating said mixture while the temperature thereof rises until the mixture becomes clear, and when the temperature of said clear mixture returns to room temperature, adding thereto about 1,530 parts of the aforesaid ethyl silicate and agitating until a clear solution results.

2. The formulation in accordance with claim 1 wherein the ethyl silicate has a free alcohol content that does not exceed about 5% and a hydrochloric acid content that does not exceed about 0.07%.

3. The formulation in accordance with claim 2 wherein the ethyl silicate has a specific gravity at 20° C. of about 1.05–1.07.

4. A slurry of the class described comprising a mixture of a binder in accordance with claim 1 and a refractory material.

5. A slurry in accordance with claim 4 including a gelling agent.

6. A slurry in accordance with claim 5 wherein the gelling agent is a solution of ammonium carbonate in distilled water in the amount of about 2 oz. of the carbonate to 1 pt. of distilled water.

7. A slurry of the class described for use in making castings having fine details comprising a mixture of about 100 cc. of a binder in accordance with claim 1 and about 192 grams of refractory having the proportions:

| Sieve size: | Approximate percentage |
| --- | --- |
| Ranging from +30 | 0 |
| Ranging from −30 to +44 | 0.8 |
| Ranging from −44 to +60 | 2.2 |
| Ranging from −60 to +100 | 10.9 |
| Ranging from −100 to +150 | 12.5 |
| Ranging from −150 to +200 | 10.2 |
| Ranging from −200 | 63.4 |

8. A slurry of the class described for use in making castings which do not have very fine details comprising a mixture of about 100 cc. of a binder in accordance with claim 1 and about 320–360 grams of refractory having the proportions:

Sieve size:  Approximate percentage
- Ranging from −10 to +16 _____ 40.3
- Ranging from −16 to +22 _____ 7.6
- Ranging from −22 to +30 _____ 5.8
- Ranging from −30 to +44 _____ .7
- Ranging from −44 to +60 _____ .7
- Ranging from −60 to +100 _____ 4.7
- Ranging from −100 to +150 _____ 6.4
- Ranging from −150 to +200 _____ 5.4
- Ranging from −200 _____ 28.4

9. A slurry of the class described for use in making castings of average quality comprising a mixture of about 100 cc. of the binder in accordance with claim 1 and about 192–360 grams of a mixture of refractories of gradings A and B, said refractories having the proportions:

Grading A:
Sieve size—  Approximate percentage
- Ranging from +30 _____ 0
- Ranging from −30 to +44 _____ 0.8
- Ranging from −44 to +60 _____ 2.2
- Ranging from −60 to +100 _____ 10.9
- Ranging from −100 to +150 _____ 12.5
- Ranging from −150 to +200 _____ 10.2
- Ranging from −200 _____ 63.4

Grading B:
Sieve size—
- Ranging from −10 to +16 _____ 40.3
- Ranging from −16 to +22 _____ 7.6
- Ranging from −22 to +30 _____ 5.8
- Ranging from −30 to +44 _____ .7
- Ranging from −44 to +60 _____ .7
- Ranging from −60 to +100 _____ 4.7
- Ranging from −100 to +150 _____ 6.4
- Ranging from −150 to +200 _____ 5.4
- Ranging from −200 _____ 28.4

References Cited in the file of this patent

UNITED STATES PATENTS

| | | |
|---|---|---|
| 2,524,358 | Robey | Oct. 3, 1950 |
| 2,703,913 | Hinde et al. | Mar. 15, 1955 |

FOREIGN PATENTS

| | | |
|---|---|---|
| 580,058 | Great Britain | Aug. 26, 1946 |
| 594,671 | Great Britain | Nov. 17, 1947 |

OTHER REFERENCES

Metallurgia, January 1950, pages 157–159.